United States Patent
Zinski et al.

(10) Patent No.: US 7,208,051 B2
(45) Date of Patent: Apr. 24, 2007

(54) UNDERBODY CAR WASH FOR HOME-USE

(75) Inventors: Mark J. Zinski, Milwaukee, WI (US); Dale R. Rosson, Elkhorn, WI (US); James W. Fleming, Appleton, WI (US); Aaron B. Arbiture, Sullivan, WI (US); Dan Herried, Milwaukee, WI (US)

(73) Assignee: ZMZ Imports, LLC, Milwaukee, WI (US)

( * ) Notice: Subject to any disclaimer, the term of this patent is extended or adjusted under 35 U.S.C. 154(b) by 292 days.

(21) Appl. No.: 10/803,228

(22) Filed: Mar. 18, 2004

(65) Prior Publication Data
US 2005/0205116 A1 Sep. 22, 2005

(51) Int. Cl.
*B08B 3/02* (2006.01)

(52) U.S. Cl. ............... 134/34; 134/99.2; 134/123; 239/722

(58) Field of Classification Search ............... 134/34, 134/99.1, 123; 239/722, 312
See application file for complete search history.

(56) References Cited

U.S. PATENT DOCUMENTS

| | | | | |
|---|---|---|---|---|
| 4,580,726 A | * | 4/1986 | Unger | 239/722 |
| 4,984,746 A | * | 1/1991 | Joyal | 239/722 |
| 5,653,392 A | | 8/1997 | Wells | 239/722 |
| 5,707,014 A | * | 1/1998 | Chan et al. | 239/754 |
| 6,079,640 A | | 6/2000 | Merritts | 239/532 |
| 6,131,831 A | * | 10/2000 | Lawrence | 239/722 |

FOREIGN PATENT DOCUMENTS

GB 1348880 * 3/1974

* cited by examiner

*Primary Examiner*—Michael Barr
*Assistant Examiner*—Saeed T. Chaudhry
(74) *Attorney, Agent, or Firm*—Whyte Hirschboeck Dudek SC

(57) ABSTRACT

An underbody car wash sprayer for home-use, which can be hooked up solely to a garden hose or in combination with a pressure washer. The device utilizes a three nozzled "I" design, supported by four swiveling casters. In addition, it is connected to an ergonomically effective wand system to allow easy maneuverability under the vehicle. Finally, in some embodiments a trigger spray gun acts as a handle and pressure regulator. The compactness of the specific design allows for significant material reduction and hence a reduction in production costs, providing the consumer with a more economical choice. Additionally, the concentrated pressure and spray pattern of the "I" design along with its precision maneuverability allows the consumer to easily access and forcefully remove sediment adhesions to the vehicle underbody while controlling water flow at all times with a trigger spray gun.

20 Claims, 6 Drawing Sheets

FIG. 3A
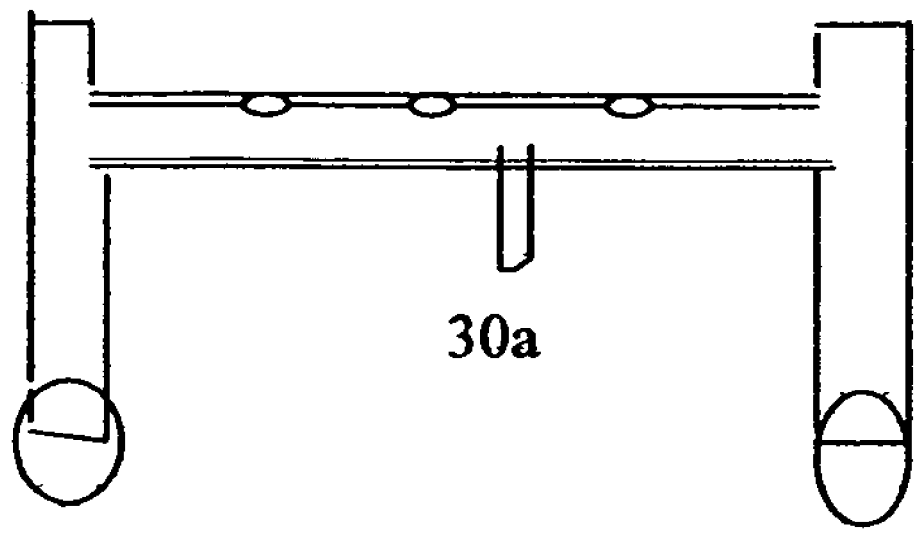
30a
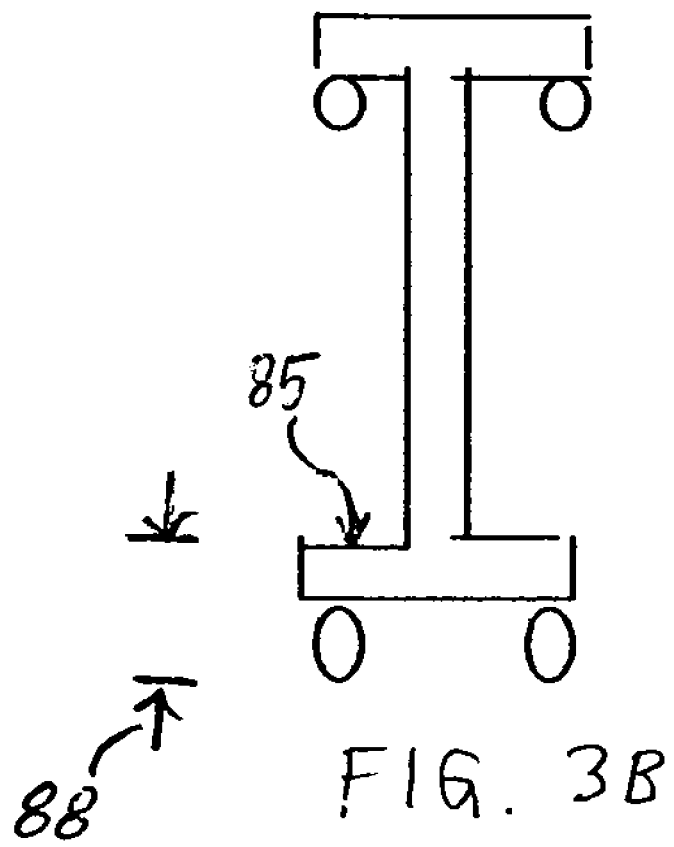
85
88
FIG. 3B

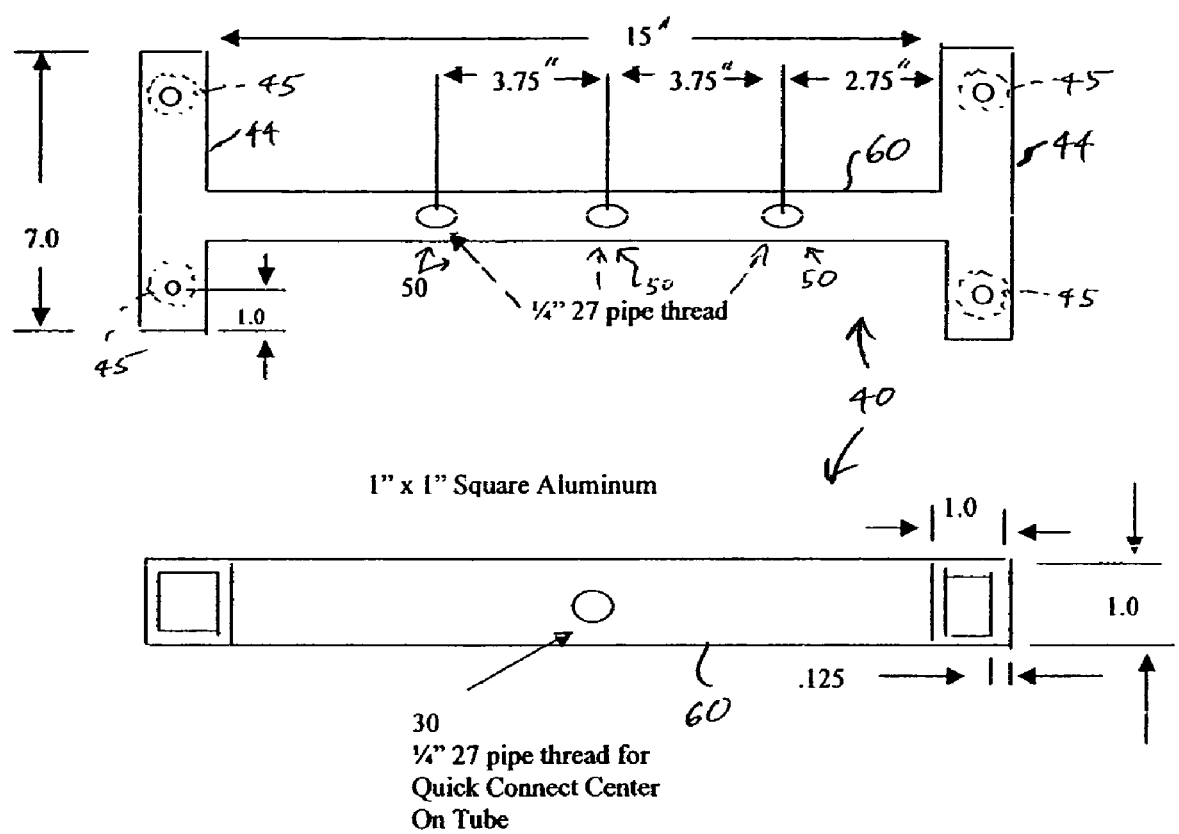

UNDERBODY CAR WASH FOR HOME-USE

FIELD OF THE INVENTION

The present invention relates to devices for cleaning automobiles and similar vehicles and, more particularly, relates to devices for cleaning the undersides of such vehicles.

BACKGROUND OF THE INVENTION

In order to better maintain and enhance the performance of automobiles and similar vehicles, as well as to enhance the vehicles' aesthetic appearance, it is desirable to maintain the cleanliness of the exteriors of the vehicles. Indeed, underbody washing maintenance has been shown to successfully stem the corrosive effects of road salt, sand, and dust, and thereby provide a consumer with repair cost savings over the life of his or her vehicle.

Given the expense associated with professionally cleaning their vehicles, many persons choose to clean their vehicles at home. Yet while the sides and tops of vehicles are readily accessible to persons who wish to manually clean their vehicles, the underbodies of vehicles are more difficult to reach by a person without specialized cleaning tools. Further, the types of dirt and other grime that collect along the underbodies of vehicles often are different than, and often are more difficult to remove than, the substances that collect on other parts of vehicles.

For these reasons, a series of devices have been developed for facilitating the home-cleaning of vehicles' underbodies, and a number of U.S. patents have issued in relation to such devices. A primary goal of such devices has been to provide consumers with mechanisms for cleaning their vehicles' underbodies that not only rival the cleaning efficacy of professional underbody wash systems available at local car washes and the like, but also are relatively inexpensive and easy to use. Typically reliant upon home water sources (e.g., the water provided via a garden hose outlet from a consumer's home), such known devices have become more practical with the advent of pressure washer systems enabling the consumer to generate pressures approaching or exceeding 1,000 psi, since the application of higher-pressure water is more effective at removing adhesive sediments from the underbody of a vehicle.

Among these known devices are those shown in U.S. Pat. No. 4,580,726 issued on Apr. 8, 1986 to Unger; U.S. Pat. No. 4,984,746 issued on Jan. 15, 1991 to Joyal; U.S. Pat. No. 5,653,392 issued on Aug. 5, 1997 to Wells; U.S. Pat. No. 5,707,014 issued on Jan. 13, 1998 to Chan et al.; and U.S. Pat. No. 6,079,640 issued on Jun. 27, 2000 to Merrits.

Although each of the known devices disclosed in the aforementioned patents can be used for the purpose of underbody cleaning, each of these devices has various disadvantages that limit the devices' efficacy. With respect to the device shown in Unger, a housing is supported upon a pair of castor wheels at opposite ends (along the sides) of the housing. The housing includes two nozzles, also positioned proximate the opposite ends of the housing, for spraying fluid upward toward a vehicle underbody. Because the housing employs a large, rectangular-shaped body, significant amounts of material must be used to form the housing. Further, because the housing employs a large amount of material, it is heavier than it might otherwise be, which can make it more difficult for a user to move or turn the housing.

Further, the use of two castor wheels makes it possible for the housing to wobble (e.g., in a front-to-back or back-to-front manner). Although this wobbling capability allows tipping of the housing fore and aft, it reduces the stability of the housing and increases the difficulty of controlling the exact direction of fluid squirted out of nozzles. This difficulty is exacerbated by the fact that the handle is flexibly coupled to the housing by way of a flexible hose portion, rather than coupled in a fixed manner. Finally, it is unclear from Unger how the two nozzles shown in that patent can be appropriately configured to maximize cleaning effectiveness of the device.

As for Joyal, while that patent discloses embodiments of underbody washing mechanisms that have T-shaped or triangularly shaped bodies with three wheels, where at least one of the wheels is a castor wheel, at least one or two of the wheels of each of the embodiments are wheels that are controllably steered by an operator by way of a handle of the respective device. Thus, while the devices in Joyal are more stable than the wobbling housing shown in Unger, the use of wheels that are controlled in their steering orientation makes the devices in Joyal complicated both in terms of operation and manufacture. In particular, in terms of operating the devices in Joyal, the use of the controllably steered wheels would appear to prevent side-to-side movement that is available with the devices in Unger. Further, to the extent that the devices in Joyal not only provide for controllably steered wheels but also link movement of the spray nozzles to movement of the steered wheels, the devices are even more complicated to operate.

Additionally, while the T-shaped embodiment shown in Joyal employs three nozzles or rotary caps (each having multiple orifices) along a central axis of the T-shaped body, this axis is oriented in a front-to-back manner as opposed to being oriented in a side-to-side manner as are the nozzles on the housing shown by Unger. Consequently, movement of the T-shaped body of Joyal underneath a car does not expose as great of an area of the underbody of the car to fluid as the device of Unger. Additionally, to the extent that the design employs the rotary caps, the design is rather complicated and lacking in robustness. As for the additional, triangular-shaped embodiment shown in Joyal, that device appears to only include a single nozzle or rotary cap, and consequently also is lacking in terms of the area of the underbody that it cleans, its complexity, and its robustness. Further, because the housings of the devices shown in Joyal are relatively large, the housings again utilize a large amount of material that can further increase the expense of manufacturing these devices.

With respect to devices shown in Wells and Chan et al., each of these devices employs a linear base having two fixed wheels spaced on opposite ends of the base and having multiple orifices/holes spaced between the wheels in a side-to-side manner. Although, in contrast to the devices in Joyal and similar to the device in Unger, the devices in Wells and Chan et al. are able to direct fluid along a wide area as the linear base is moved underneath an automobile, the use of fixed wheels along the sides of the linear base prevents easy side-to-side movement underneath the automobile. Additional fixed wheels shown in Chan et al. that are coupled to a handle extending rearward from the linear base further compound this problem. Additionally, it is not clear from these patents that an efficient spray pattern can be achieved given the particular nozzle arrangements that are employed. Further, the device shown in Chan et al. in particular requires a large number of parts so that it can perform a variety of cleaning functions, and consequently is relatively expensive to manufacture.

As for the device shown in Merrits, this device does not include a wheeled base resting along the ground but rather employs a series of orifices along an end portion of the handle that is supported by the operator. As in the case of one of the devices shown in Joyal, these orifices are positioned along the handle from front-to-back rather than in a side-to-side orientation, and consequently, as in the case of Joyal, the amount of area impacted by cleaning fluid is undesirably limited. Further, because a base is not used, it is difficult for an operator to control the direction of fluid emanating from the nozzles.

Given these limitations associated with the prior art, it would be advantageous if a new, improved device for cleaning the underbodies of automobiles and similar vehicles could be developed. In particular, it would be advantageous if such a device was easily maneuverable in all directions by an operator, including not only frontward and backward, but also sideways movements. It would further be advantageous if such a device was highly stable, particularly in terms of the portion of the device from which fluid emanated, thereby allowing an operator to more easily and consistently clean the underbody of a vehicle. It would additionally be advantageous if the device was capable of directing fluid at a wide area under a vehicle in an efficient manner, so that a large vehicle underbody could be exposed relatively rapidly to fluid in a manner that made efficient use of water resources. It further would be advantageous if the device was inexpensive to manufacture and did not require a large number of parts and/or a large amount of manufacturing material. Additionally, it would be advantageous if such a device more effectively distributed or applied water (and/or other cleaning solutions) on the underbodies of vehicles than conventional devices. Further, it would be advantageous if such a device could utilize water sources conventionally available at consumers' homes, such as the tap for a garden hose, and advantageous if such a device was relatively simple to use.

SUMMARY OF THE INVENTION

The present inventor has recognized that an improved underbody cleaning device could, in certain embodiments, employ a set of water/cleaning solution emission nozzles spaced in a side-to-side manner along a central axis of an I-shaped base, where the I-shaped base further was mounted on four caster wheels positioned respectively on or near the respective endpoints of the end cross-axes of the I-shaped base. By connecting the I-shaped base to a water supply by way of a control arm coupled at the center of the central axis and extending outward substantially perpendicular therefrom, a user could easily control the positioning of the I-shaped base so as to expose a large swath of the underbody of a vehicle to water or other cleaning fluid. Use of the four swiveling caster wheels would render the I-shaped base both highly stable and easily maneuverable in terms of both frontward/backward and side-to-side movement, and use of an I-shaped base would minimize material requirements.

In some embodiments of the present invention, in particular, three nozzles are positioned along the central axis of the I-shaped base in a manner intended to maximize cleaning efficiency. Further, in some embodiments, the handle extends from the I-shaped base horizontally outward and then, at a location sufficiently distant from the base so that it would typically be clear of the vehicle during use, the handle further extends upward and outward at a 135 degree angle. Additionally, in yet other embodiments, a base having a shape other than an I-shape could be employed, or a base supported by only 3, or more than four, caster wheels could be used.

In particular, the present invention relates to an apparatus for applying a fluid to an underbody of a vehicle. The apparatus includes a handle configured to receive fluid at a first location on the handle and further configured to provide the received fluid to a second location on the handle. The apparatus further includes a base coupled to the second location on the handle, where at least a portion of the handle extends toward the base along a first axis. The base includes a torso and also at least three wheels coupled to the torso at three locations on the torso, where each of the wheels is coupled to the torso in a manner allowing for a respective rotational axis about which the wheel rotates to rotate about a respective additional axis, and where each wheel is capable of interfacing a support surface at a tangent location at the bottom of the respective wheel, the respective tangent locations defining a plane. The base further includes at least two nozzles having external orifices proximate a top of the torso that are directed to emit the fluid, where the two nozzles are spaced apart from another along a second axis that at least includes a component that is perpendicular to the first axis, and at least one internal channel capable of communicating fluid received from the handle to the nozzles.

The present invention further relates to an apparatus for washing an underbody of a vehicle. The apparatus includes a base, at least two orifices on the base, the orifices being spaced apart from one another along a side-to-side axis, at least three freely-swiveling wheels coupled to the base and supporting the base in a non-wobbling manner, and a handle coupled to the base and extending away from the base along a generally front-to-back axis.

The present invention additionally relates to a method of cleaning an underbody of a vehicle. The method includes providing an underbody cleaning device having a base stably supported upon at least three freely-swiveling wheels and a handle coupled to the base, where the base includes at least two substantially-upwardly-directed orifices positioned at different respective locations along a first axis that is substantially parallel to the ground and substantially perpendicular to a second axis along which a portion of the handle extends away from the base. The method further includes coupling the underbody cleaning device to a source of pressurized fluid, and moving the base of the underbody cleaning device under the vehicle so that the base moves in a first direction having a forward component that is substantially perpendicular to the first axis. Due to the wheels being freely-swiveling, the base can also be moved in a second direction generally perpendicular to the first direction.

BRIEF DESCRIPTION OF THE DRAWINGS

FIGS. 3A and 3B show, respectively, two perspective views of a base of the device of FIG. 1;

FIGS. 4A and 4B show top and side elevation views of an I-shaped structure forming a portion of the base shown in FIGS. 1, 3A and 3B;

DETAILED DESCRIPTION OF THE PREFERRED EMBODIMENTS

Figure 1:
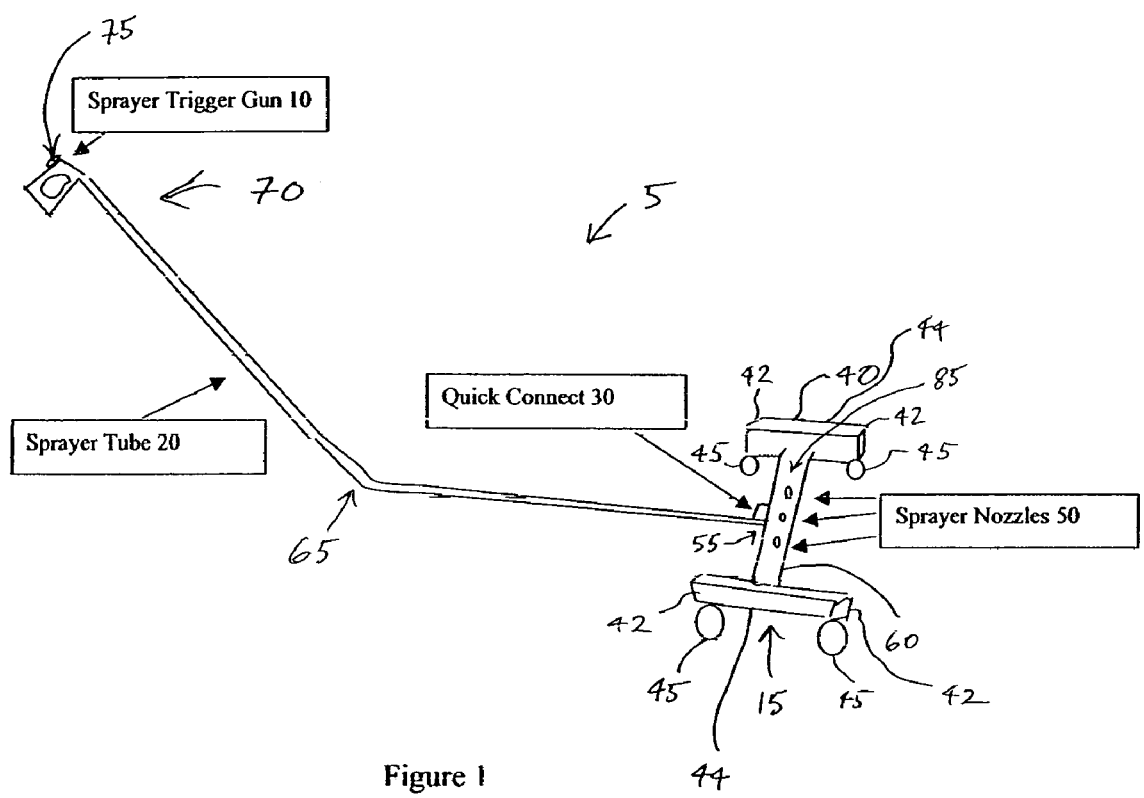
FIG. 1 shows a perspective view of a device for cleaning the underside of a vehicle in accordance with one embodiment of the present invention.

Referring to FIG. 1, an exemplary underbody cleaning device 5 in accordance with one embodiment of the present invention includes a base 15 having an I-shaped torso 40 coupled to and supported by four freely-swiveling casters 45 (or similar wheeled-type components that freely allow movement in a variety of directions). At or proximate to a central location 55 along a central axis bar 60 of the I-shaped torso 40 is coupled a handle 65 that includes therewithin (or itself constitutes) a tube 20 that is capable of communicating fluids such as water and/or cleaning solution from an inlet 75 to a quick-connect 30 on the base 15. Fluids provided to the quick-connect 30 are in turn communicated within the I-shaped torso 40 (e.g., by way of one or more tubes or similar passages therewithin, not shown) to one or more sprayer nozzles 50 mounted along a top side 85 of the I-shaped torso 40 spaced along the central axis bar 60.

Further as shown in FIG. 1, the four casters 45 each are positioned at respective ends 42 of end cross-bars 44 of the I-shaped torso 40. By using four casters 45 in this manner, the base 15 is highly stable, and the fluid emanating from the nozzles 50 is sprayed in a consistent manner regardless of movements of the base 15. Further, because the handle 65 extends perpendicularly (or substantially perpendicularly) away from the central axis bar 60, the nozzles 50 when directed underneath a vehicle generally direct fluid towards a wide swath of the underbody rather than just a narrow swath that might otherwise be impinged if such nozzles were aligned parallel to the handle 65 rather than along the central axis bar. Consequently, cleaning of the entire underbody of a vehicle can be performed much more rapidly than would be possible using nozzles aligned along the handle.

Also as shown in FIG. 1, in a preferred embodiment, the handle 65 at a far end 70 away from the I-shaped torso 40 includes a sprayer trigger gun 10. The gun 10 governs whether fluid communicated to the inlet 75 is in turn communicated to the quick connect 30 and in turn to the sprayer nozzles 50 (the inlet 75 in at least some embodiments is an inlet to the gun). Preferably, the sprayer-trigger gun 10 is detachable from a remainder of the handle 65 and is capable of handling high pressures, such as 1800-psi. The inlet 75 of the handle 65 (and/or the gun 10) preferably is threaded and capable of being coupled directly to a garden hose or to an outlet of a pump, such as a 1300-psi pump. Insofar as the sprayer trigger gun 10 typically will be the portion of the handle 65 that is usually handled by a user, the sprayer trigger gun 10 typically serves not only as a control valve governing the communication of fluid to the sprayer nozzles 50 but also operates as the grasping/steering mechanism by which a user is able to position the base 15 appropriately under a vehicle.

Figure 2:
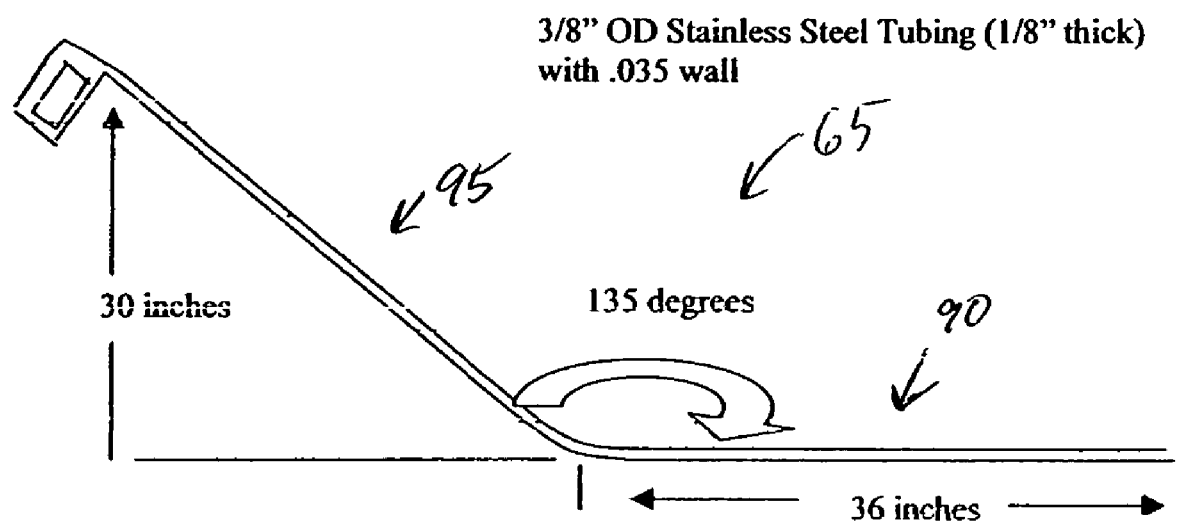
FIG. 2 shows an elevation view of the handle employed in the device of FIG. 1.

In preferred embodiments, the handle 65 is formed simply as the combination of the sprayer trigger gun 10 and the sprayer tube 20. In some such embodiments, the sprayer tube 20 is made of stainless steel type 316, with ⅜ inch OD, a thickness of ⅛ inch, and a 0.035 wall. Further, with respect to the length and height of the handle 65/sprayer tube 20, FIG. 2 shows the dimensions of the sprayer tube in one such embodiment. Because the handle 65 is intended to reach well under (and typically at least half-way under) a vehicle, the handle 65 includes a horizontal portion 90 designed to extend under the vehicle. Since an average automobile's width is 6 feet, in the present embodiment the horizontal portion extends at least half of 6 feet, or 36 inches, as shown in FIG. 2.

To allow a user to control the positioning of the base 15 while standing up, the handle 65 includes a second, vertically-extending portion 95 that generally extends to a level such that the sprayer trigger gun 10 could be easily grabbed and controlled by a user with his or her hand without bending over. In the preferred embodiment, the portion 95 is not directly vertical but rather is diagonally oriented, to facilitate direction of the base 15 by a user without requiring excessive rotational exertion by way of the user's wrist. To this end, one preferred ergonomic design of the vertically-extending portion 95 involves a vertically-extending portion angled at 135 degrees relative to the horizontal portion 90 and extending about 30 inches higher than the horizontal portion 90 as shown.

Referring to FIG. 3A, the quick connect 30 is positioned on the I-shaped torso 40 so as to be easily connected to the tube 20/handle 65 in manners well known-to those of ordinary skill in the art. In some embodiments, for example, the quick connect 30 encompasses a threaded, male-type extension capable of being attached to a handle having a threaded, female-type end (or vice-versa). FIG. 3A in particular shows a ⅜ inch quick-connect 30 that is positioned slightly to the right of the center of the I-shaped torso 40 (and to the right of the center nozzle 50), albeit in alternate embodiments, the quick-connect could be directly centered on the I-shaped torso 40 or positioned at another location on the torso. Typically the quick-connect 30 is positioned at or near the center of the I-shaped torso 40 for providing a "balanced feel" to an operator moving the device 5.

As for FIG. 3B, a height 88 of the top side 85 of the I-shaped torso 40 relative to the ground or other surface on which it is mounted (as supported by the casters 45) is, in a preferred embodiment, shown to be 4" inches high due to consideration of the average height of a vehicle underbody and the spray pattern to be discussed below with reference to FIG. 6. Although not necessarily the case, the nozzles 50 in the present embodiment do not extend upward beyond the top side 85 of the I-shaped torso 40, to avoid the possibility of one or more of the nozzles becoming caught on a portion of a vehicle or another component.

Figure 5:
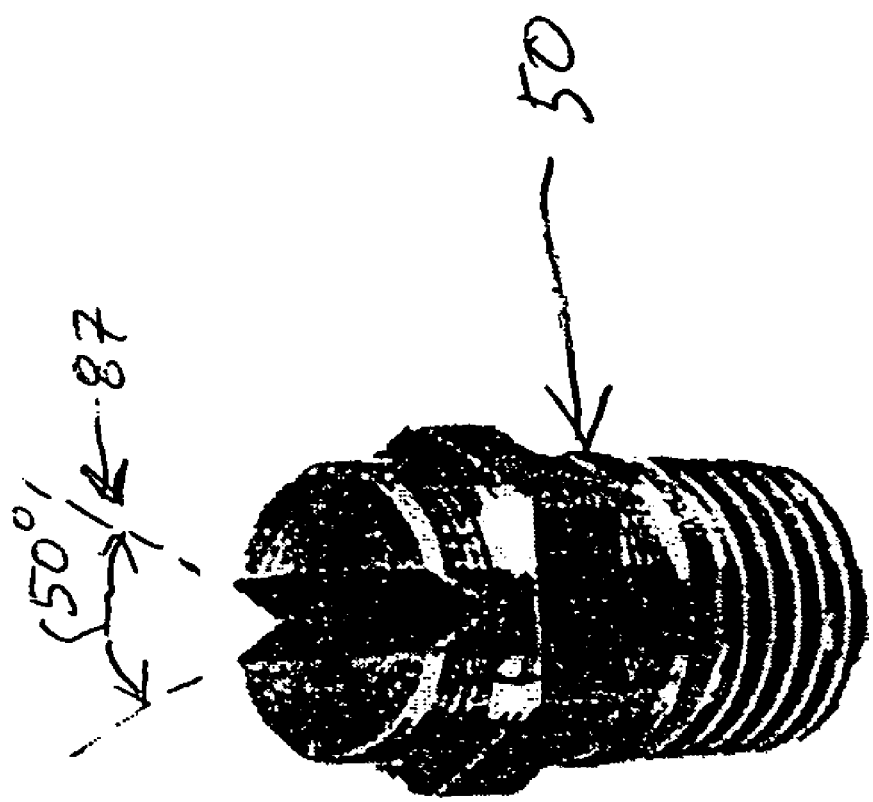
FIG. 5 shows a perspective view of an exemplary spray nozzle capable of being mounted on the base of FIGS. 3A, 3B, 4A and 4B.

FIGS. 4A and 4B show in greater detail a preferred embodiment of the I-shaped torso 40. In this embodiment, the I-shaped torso 40 is made from an aluminum tube that is 1×1×⅛ inch thick. The central axis bar 60 of the I-shaped torso measures 15" inches in length, while each of the end cross-bars 44 measure 7 inches in length. The quick-connect 30 in the embodiment shown is adjoined to the aluminum via a ¼ inch 27 pipe thread. Also, the three sprayer nozzles 50 are shown in FIG. 5 to be spaced apart from one another by a spacing of 3.75 inches, with at least one of the end nozzles being spaced from one of the end cross-bars 44 by 2.75 inches. Additionally, the nozzles 50 have a ¼" 27 pipe thread for being coupled to the I-shaped torso 40. Also, as shown in FIG. 5, in a preferred embodiment, each of the nozzles 50 is a brass flat fan spray nozzle with an orifice of 0.057 inches and spray angle 87 of 50 degrees.

Figure 6:
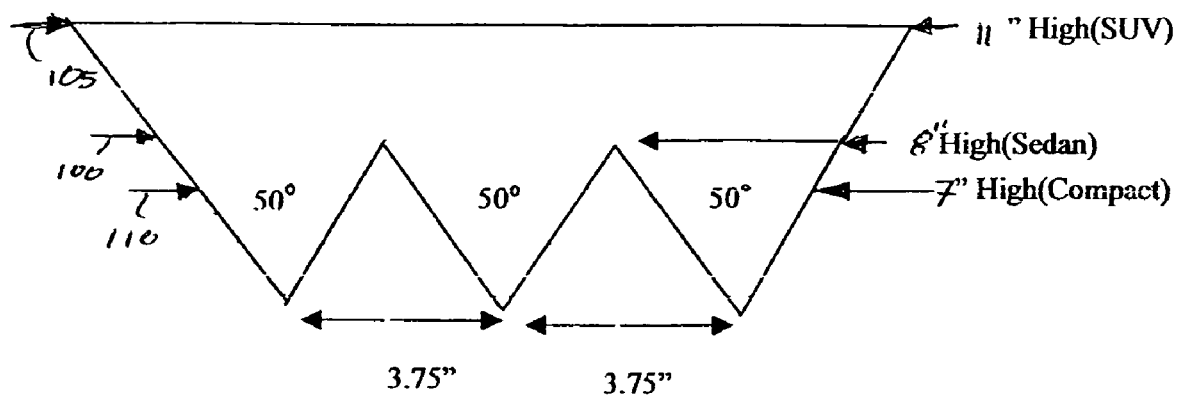
FIG. 6 shows schematically paths of water and/or cleaning solution emanating from nozzles of the device of FIG. 1.

FIG. 6 depicts a spray pattern that can be achieved using the device 5 in accordance with the preferred embodiments in FIGS. 3B, 4A, 4B and 5. Given a height of the top side 85 of the I-shaped torso 40 of 4 inches, which is about half of the generally accepted height of an average sedan (e.g., 8 inches), fluid emanating from the three nozzles 50 covers continuously a wide area 100 of the underbody that is 4 inches above the nozzles. If the device is provided under a larger vehicle, such as a sport utility vehicle (SUV) having generally an underbody height of 11 inches off of the ground, a larger area 105 is continuously impacted by fluid from the nozzles 50. If the device is provided under a smaller vehicle, such as a compact car having generally an underbody height of 7 inches off of the ground, a smaller area 110 is impacted, in only a discontinuous manner.

Although the embodiments discussed above are certain embodiments encompassed by the present invention, the present invention is intended to encompass other embodiments as well. For example, in alternate embodiments, the present invention could employ a differently-shaped base that was supported by caster wheels or otherwise swiveling wheels. In each of these embodiments, the base would be supported by at least three such wheels so that the base was supported in a stable manner above the ground or other surface on which it was situated. The base preferably would be designed so as to reduce the amount of material required for its formation. The shape of the base would, however, necessarily be of a form such that the three or more castor wheels were positioned to maintain stability.

For example, the base could take on the shape of a perimeter of a rectangle or an isosceles triangle with castor wheels at each of the corners of rectangle/triangle. Alternately, the base could take on a T-shape or a plus sign-shape with swiveling castor wheels at each of the ends of the bars forming the shapes. In each such design, however, multiple nozzles would be positioned along one or more of the bars so that the nozzles were spaced generally along an axis having a substantially side-to-side component. Thus, a V-shaped design with two castor wheels at the ends of each leg of the V and also an additional wheel at the vertex of the V could also be employed, with nozzles on the diagonally-directed legs of the V, since the nozzles would still be spaced apart from one another along such a side-to-side axis.

The materials used to form the base, the handle, and other portions of the device in accordance with the present invention can also vary from those discussed above in alternate embodiments. Also, the base 15 need not have a rectangular/square cross-section as shown in FIG. 4B, and nozzles 50 can take on a variety of types other than that shown in FIG. 5. In certain alternate embodiments, particularly those employing nozzles having angles of dispersion greater or less than 50 degrees, the number of nozzles and/or the spacing of nozzles can vary from the three nozzles spaced apart as shown in FIG. 4A. For example, in some embodiments, four nozzles each having a smaller angle of dispersion could be employed. While nozzles are used in the present embodiment, simple orifices or other spraying devices could also be used. Further, in certain embodiments, the castor wheels are mounted to the I-shaped torso 40 in a manner such that the height of the torso can be varied from the ground, to adjust for the type of vehicle with respect to which the device is being used.

In further alternate embodiments, convex, circular mirrors with periscopic design could be attached to the handle 65 allowing a user to view any section of the underbody through the mirror system while remaining in standing position. Also, in some alternate embodiments, the handle could be telescopically collapsible, thus allowing the device to be folded and stored more easily. Further, in some alternate embodiments, a battery-operated light attachment would be mounted on the handle and/or the base to allow for increased visibility.

Additionally, in some alternate embodiments, the base would allow for various nozzles to be mounted and interchanged with one another to accommodate potential consumer preferences for spray distribution based on vehicle type and height. Further, in some of the embodiments that employ the trigger gun, one or more adjustable pressure inputs could be provided on the trigger-gun. Further, in some alternate embodiments, a water basin attachment to collect water for conservation or to prevent run-off if using device in conjunction with soap injector could be employed. Additionally, a brush system could be employed on the base or otherwise to allow user to scrub road sediment from underbody. Further, the sprayer tube could be detachable so as to be used independently as a separate spray wand for washing other parts of the vehicle.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. An apparatus for applying a fluid to an underbody of a vehicle, the apparatus comprising:
   a handle configured to receive fluid at a first location on the handle and further configured to provide the received fluid to a second location on the handle; and
   a base coupled to the second location on the handle, wherein at least a portion of the handle extends toward the base substantially along a first plane, and wherein the base includes:
   a torso;
   at least three wheels coupled to the torso at three locations on the torso, wherein each of the wheels is coupled to the torso in a manner allowing for a respective rotational axis about which the wheel rotates to rotate about a respective additional axis, and wherein each wheel is capable of interfacing a support surface at a tangent location at the bottom of the respective wheel, the respective tangent locations defining a second plane;
   at least two nozzles having external orifices proximate a top of the torso that are directed to emit the fluid, and wherein the two nozzles are spaced apart from another along a first axis that is substantially perpendicular to the first plane; and
   at least one internal channel capable of communicating fluid received from the handle to the nozzles.

2. The apparatus of claim 1, wherein the torso includes a central axis bar and two end cross-bars coupled to the central axis bar to form substantially an I-shaped component.

3. The apparatus of claim 2, wherein the nozzles are spaced apart from one another along the central axis bar.

4. The apparatus of claim 3, wherein the at least two nozzles include three nozzles, and wherein the central axis bar is substantially parallel to the first axis.

5. The apparatus of claim 2, wherein the at least three wheels include four wheels respectively coupled to four respective ends of the two end cross-bars.

6. The apparatus of claim 5, wherein each of the four wheels is a caster-type wheel.

7. The apparatus of claim 1, wherein the handle includes a first portion that extends substantially horizontally away from the torso and a second portion that extends in a direction having a vertical component away from the first portion of the handle.

8. The apparatus of claim 1, wherein the handle includes, proximate the first location, a sprayer trigger gun.

9. The apparatus of claim 1, wherein the sprayer trigger gun is detachable.

10. The apparatus of claim 1, wherein the handle is detachable from the base.

11. The apparatus of claim 1, wherein the nozzles are positioned on the torso so that, when the fluid emanates from the nozzles, the fluid impacts a substantially continuous area along an underbody of the vehicle.

12. The apparatus of claim 1, wherein the base is configured so that the fluid emanates from the nozzles at approximately 4 inches above a ground surface supporting the base, wherein the nozzles each have an approximately 50 degree spraying angle, and wherein the neighboring ones of the nozzles are spaced apart from one another by approximately 3.75 inches.

13. The apparatus of claim 1, wherein the handle is rigidly connected to the base.

14. The apparatus of claim 1, wherein the torso has a shape generally similar to that of a triangle, a T, and a rectangle.

15. The apparatus of claim 1, wherein at least one of the following is true:
   coupled to one of the base and the handle is a minor;
   coupled to one of the base and the handle is a light;
   the base includes means for varying a height of the torso relative to a ground surface supporting the base;
   the base is supported upon a water basin; and
   one of the base and the handle supports a brush.

16. An apparatus for washing an underbody of a vehicle, the apparatus comprising:
   a base;
   at least two orifices on the base, the orifices being spaced apart from one another along a side-to-side axis;
   at least three freely-swiveling wheels coupled to the base and supporting the base in a non-wobbling manner; and
   a handle coupled to the base and extending away from the base along a generally front-to-back axis.

17. The apparatus of claim 16, further comprising a means for controlling fluid communicated to the orifices.

18. The apparatus of claim 16, wherein the base is I-shaped.

19. The apparatus of claim 18, wherein the at least two orifices include three nozzles directed upward, and wherein the handle includes a first horizontal section and a second section extending upward at approximately a 135 degree angle relative to the first horizontal section.

20. A method of cleaning an underbody of a vehicle, the method comprising:
   providing an underbody cleaning device having a base stably supported upon at least three freely-swiveling wheels and a handle coupled to the base, wherein the base includes at least two substantially-upwardly-directed orifices positioned at different respective locations along a first axis that is substantially parallel to the ground and substantially perpendicular to a second axis along which a portion of the handle extends away from the base;
   coupling the underbody cleaning device to a source of pressurized fluid;
   moving the base of the underbody cleaning device under the vehicle so that the base moves in a first direction having a forward component that is substantially perpendicular to the first axis,
   wherein due to the wheels being freely-swiveling, the base can also be moved in a second direction generally perpendicular to the first direction.

* * * * *

UNITED STATES PATENT AND TRADEMARK OFFICE
CERTIFICATE OF CORRECTION

| | | |
|---|---|---|
| PATENT NO. | : 7,208,051 B2 | Page 1 of 1 |
| APPLICATION NO. | : 10/803228 | |
| DATED | : April 24, 2007 | |
| INVENTOR(S) | : Mark J. Zinski et al. | |

It is certified that error appears in the above-identified patent and that said Letters Patent is hereby corrected as shown below:

Column 9, line 23: Replace "minor" with --mirror--.

Signed and Sealed this

Thirtieth Day of October, 2007

JON W. DUDAS
*Director of the United States Patent and Trademark Office*